United States Patent
Pillai et al.

(10) Patent No.: US 10,049,338 B2
(45) Date of Patent: Aug. 14, 2018

(54) REAL-TIME IN-MEMORY CHARGE COMPUTATION

(71) Applicant: SAP SE, Walldorf (DE)

(72) Inventors: Krishnanunni Sudhakaran Pillai, Cochin (IN); Saurabh Chaturvedi, Lucknow (IN)

(73) Assignee: SAP SE, Walldorf (DE)

( * ) Notice: Subject to any disclaimer, the term of this patent is extended or adjusted under 35 U.S.C. 154(b) by 833 days.

(21) Appl. No.: 14/076,265

(22) Filed: Nov. 11, 2013

(65) Prior Publication Data

US 2015/0134489 A1 May 14, 2015

(51) Int. Cl.
*G06Q 30/00* (2012.01)
*G06Q 10/08* (2012.01)
*G06Q 30/06* (2012.01)

(52) U.S. Cl.
CPC ..... *G06Q 10/08345* (2013.01); *G06Q 10/087* (2013.01); *G06Q 30/0633* (2013.01); *G06Q 30/0635* (2013.01)

(58) Field of Classification Search
CPC ......... G06Q 10/08345; G06Q 30/0635; G06Q 30/0633; G06Q 10/087
See application file for complete search history.

(56) References Cited

U.S. PATENT DOCUMENTS

| | | | |
|---|---|---|---|
| 5,761,432 A | 6/1998 | Bergholm et al. | |
| 5,835,899 A | 11/1998 | Rose et al. | |
| 6,318,100 B1 | 11/2001 | Brendel et al. | |
| 6,879,962 B1 | 4/2005 | Smith et al. | |
| 6,937,992 B1 | 8/2005 | Benda et al. | |
| 7,050,995 B2 | 5/2006 | Wojcik et al. | |
| 7,421,397 B2 | 9/2008 | Podgurny et al. | |
| 7,424,435 B1 | 9/2008 | Yamagami et al. | |
| 8,121,959 B2 | 2/2012 | Delvat | |
| 8,554,694 B1 | 10/2013 | Ward et al. | |
| 2002/0007353 A1 | 1/2002 | Kornacki | |

(Continued)

FOREIGN PATENT DOCUMENTS

| | | |
|---|---|---|
| EP | 1297472 A2 | 4/2003 |
| WO | WO2002052380 A2 | 7/2002 |
| WO | WO2012120538 A2 | 9/2012 |

*Primary Examiner* — William J Allen
*Assistant Examiner* — Anand R Loharikar
(74) *Attorney, Agent, or Firm* — Buckley, Maschoff & Talwalkar LLC

(57) ABSTRACT

In an embodiment, a transport management application is executing in the application layer. User may place orders by specifying order data in a user interface of the transport management application, and initiate calculate charges to calculate transportation charges for the orders. Based on the initiation, the charge calculation function is invoked in the application layer. Charge calculation function reads the order data specified in the user interface, and invokes charge computation engine in an in-memory database. Orders are split and grouped based on number of dimensions in a rate table. Charge computation engine looks up master data and computes transportation charges for the grouped orders in parallel. After the charge computation engine determines the transportation charges for the orders, sum of the transportation charges is returned to the application layer.

20 Claims, 9 Drawing Sheets

(56) References Cited

U.S. PATENT DOCUMENTS

| | | | |
|---|---|---|---|
| 2002/0019759 A1* | 2/2002 | Arunapuram | G06Q 10/04 |
| | | | 705/7.26 |
| 2005/0075952 A1 | 4/2005 | Zhang et al. | |
| 2006/0074791 A1 | 4/2006 | Jelaco | |
| 2007/0011053 A1 | 1/2007 | Yap | |
| 2008/0294484 A1 | 11/2008 | Furman et al. | |
| 2009/0172099 A1 | 7/2009 | Lee et al. | |
| 2012/0002965 A1 | 1/2012 | Bellato et al. | |
| 2012/0011039 A1 | 1/2012 | Cina et al. | |
| 2012/0296769 A1 | 11/2012 | Ginster, II et al. | |
| 2013/0069803 A1 | 3/2013 | McCormick et al. | |
| 2013/0159059 A1 | 6/2013 | Malov | |
| 2013/0246298 A1 | 9/2013 | Higham et al. | |
| 2014/0157370 A1* | 6/2014 | Plattner | G06F 21/6245 |
| | | | 726/4 |
| 2014/0279321 A1 | 9/2014 | Karunamurthy et al. | |

\* cited by examiner

FREIGHT ORDER: CARGO INFORMATION

[SAVE] [✗ CANCEL] [✎ EDIT] [ ] [ ] [SCHEDULE▲] [CALCULATE CHARGES▲] [SET STATUS▲] [SET ITEM STATUS▲]

▶ COST DISTRIBUTION  CARGO

LOCATION [BLR]  CUSTOMER BANGALORE..  DATE [          ] [00:00:00] INDIA

[INSERT PRODUCT▲] [SET TO LOADED▲] [REPORT DISCREPANCIES▲] [CARGO MANAGEMENT]

| ITEM HIERARCHY | CARGO WEIGHT... | UoM | CARGO VOLUME | UoM | PIECES | PURCHSING ORGANIZATION | PURCHASING GROUP | LOCATION |
|---|---|---|---|---|---|---|---|---|
| ORDER 1234 | 60,000.00 | KG | 60 | M3 | 6 | YYYY | ZZZ | CHE. |
| SAMPLE | 20,000.00 | KG | 20 | M3 | 2 | GG | | GOA |

FREIGHT ORDER: ORDER 1234
[SAVE] [XCANCEL] [✏EDIT] [↻] [🗑] [SCHEDULE▾] [CALCULATE CHARGES▾] [SET STATUS▾] [SET ITEM STATUS▾]
  CALCULATE CHARGES 505
  CALCULATE INTERNAL CHARGES

NOTES  BUSINESS PARTNER  TERMS AND CONDITIONS  CHARGES  GENERAL DATA  EXECUTION  INTERNAL CHARGES  STATUSES

SETTLEMENT DATA 550
  INVOICING STATUS [01] NOT INVOICED                    CALCULATION DATE [16.08.2013] 📅
  CHARGE CALC. STATUS [02] CALCULATED
  TOTAL AMOUNT IN LOCAL CURRENCY [8,468.57] INR          EXCHANGE RATE DATE [16.08.2013] 📅

[CHARGE ITEMS]
[↑][↓] [INSERT▾] [VIEWS▾]

| CHARGE HIERARCHY | RATE TABLE | CHARGE TYPE | RATE | CURRENCY | QUANTITY | CALC. | CURRENCY | FINAL AMOUNT 530 | CURRENCY |
|---|---|---|---|---|---|---|---|---|---|
| SUM 540 | | SUM | | | | | | 8,468.57 | INR |
| ▶ XX TRUCKING LTD | | | | | | | | 8,468.57 | INR |
| LOADING CHARGE1 525 | LOAD RATE TABLE | CHARGE1 | 100.00 | INR | | 100.00 | INR | 100.00 | INR |
| ADDITIONAL CHARGES | ADD RATE TABLE | CHARGE2 | 1,500. | INR | 49. | 7,470. | INR | 7,470.74 | INR |
| FUEL SURCHARGE | FUEL RATE TABLE | FUEL SURCHARGE | 5.00 | % | | 373.54 | INR | 373.54 | INR |
| ▼ LINE ITEM SELECTION | | COMPARE | 600.00 | INR | | 600.00 | INR | 600.00 | INR |

→ 510
→ 515
→ 520

DETAILS: SUM
[OVERVIEW] [EXCHANGE RATES]

CHARGE MANAGEMENT MASTER DATA
  BUSINESS PARTNER [BP1]                                                    DATES
  AGREEMENT [AGREEMENT1] 🔍 DISPLAY AGREEMENT            CALCULATION DATE [16.08.2013]
  CALCULATION SHEET [CALSHEET1] 🔍 DISPLAY CALCULATION SHEET   MANUALLY-CHANGED CALC. DATE ☐
                                                         EXCHANGE RATE DATE [16.08.2013]

DISPLAY RATE TABLE DEFINITION – LOAD RATE TABLE 605

[■ SAVE] [✗ CANCEL] [▨ EDIT] [⊕]

▼ GENERAL DATA    DATA AND VALUES    ADMINISTRATIVE DATA

| VALID FROM | VALID TO | AGGREGATED RATE DESC. | LIFE CYCLE STATUS (DESCRIPTION) | CURRENCY | ROUNDING PROFILE | ARCHIVING STATUS |
|---|---|---|---|---|---|---|
| 01.01.2011 | 01.01.2080 | RATES | RELEASED | INR | | NOT ARCHIVED |

DETAILS: VALIDITY FROM 01.01.2011 – VALIDITY TO 01.01.2080 ◀── 610

[ RATES ] [ CALCULATION RULES ] [ SCALE ITEMS ]

HIDE FILTER
SET FILTER

VARIANT: [ ▽ ]  [SAVE] [SAVE AS] [DELETE]
☑ SET AS DEFAULT VARIANT:

GROSS WEIGHT [▽]  IS [▽]  [        ] [▨] KG

[APPLY] [RESET]

[▨] [DISPLAY RATES ▾]                    [SHOW NOTES]    VIEW: [STANDARD VIEW ▽]  [EXPORT ▾]

| <=100.00KG 620 | >=100.00 KG 625 | >=1,000.00 KG 630 | >=10,000.00 KG 640 | >=50,000.00 KG (R) | MAXIMUM VALUE |
|---|---|---|---|---|---|
| 100.00 | 250.00 | 300.00 | 400.00 | 500.00 | 500.00 |

FIG. 6

REAL-TIME IN-MEMORY CHARGE COMPUTATION

BACKGROUND

In transportation management, activities connected with physical transportation of goods from one location to another are managed. Some enterprises deal with transport management, where orders related to physical transportation of goods are managed and maintained. Orders correspond to the physical transportation of goods. The physical transportation of goods includes activities such as freight order management, freight settlement, transportation planning, carrier selection, agreement selection, rate computation, etc. Transportation management application can be used by goods manufacturers to manage physical transportation of their goods or it can be used by freight forwarders who manage the physical transport of goods from multiple manufacturers or it can be used by carriers who actually own the aircrafts, ships, trucks etc. used for physical transportation of goods. Typically, enterprises involved in transport management handle enormous amount of data in denomination of millions or more. When multiple orders are required to be processed at the same time, orders are processed one by one by performing lookup on data stored in database tables multiple times and computing the transportation charges. This results in increased order processing time.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 4 is a block diagram illustrating a user interface for managing cargo information of the freight order, according to one embodiment.

FIG. 5 is a block diagram illustrating a user interface for calculating transportation charges, according to one embodiment.

FIG. 6 is a block diagram illustrating a user interface of rate table definition, according to on embodiment.

DETAILED DESCRIPTION

Figure 1:
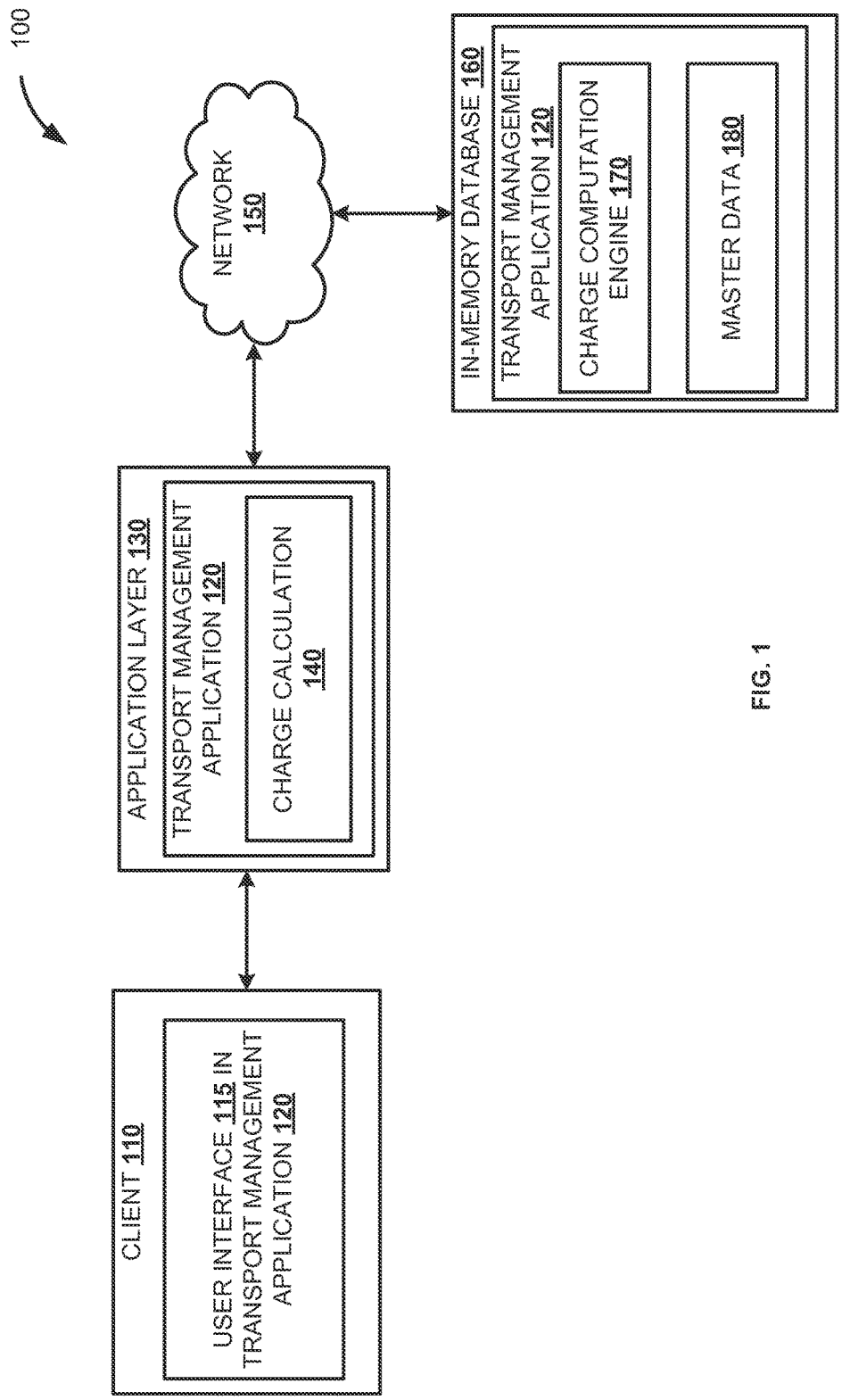
FIG. 1 is a block diagram illustrating an exemplary environment for real-time in-memory charge computation, according to an embodiment.

Embodiments of techniques for real-time in-memory charge computation are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Enterprises dealing with transport management manage and maintain physical transportation of goods using orders. Orders correspond to the physical transportation of goods. The physical transportation of goods is accompanied by activities such as freight order management, freight settlement, carrier selection, agreement selection, rate computation, etc., e.g., performed in a transport management application. When an 'item A' needs to be transported from a 'physical location A' to a 'physical location B', an order is created by an ordering party for 'item A' specifying order data required for transportation. The freight order management activity includes executing the order for 'item A' through the transport management application. Orders form the basis for transportation planning which determines the route that 'item A' is required to take.

Based on the determined route for 'item A', an appropriate freight forwarder or carrier is identified. Freight orders can include land transportation, sea transportation and/or air transportation. Freight orders are a result of transportation planning which comprises of route and carrier selection. Carriers are entities that offer service of transporting goods under license from a regulatory body. Based on the 'freight order' for 'item A', 'carrier A' is selected to transport 'item A' from the 'physical location A' to the 'physical location B' via the determined route. Transport management application may calculate transportation charges in a charge computation engine based on master data such as agreement, calculation sheet, rate table, etc. Master data are static data, usually available in enormous volume, and they may be used to enable various business transactions.

In some transport management applications, an order created, e.g., in a graphical user interface at a client, is sent to an application layer, where the application layer has the appropriate program logic to calculate the transportation charges for the order, by fetching master data from a database. When an order list comprising a set of orders is required to be processed, orders may be processed one at a time by the application layer. For the first order the route that the goods in that order are required to take is determined. Based on the determined route, freight forwarder and/or carriers are identified. Charge computation engine calculates the transportation charges for the first order by looking up the enormous quantity of master data in the database, and calculates and returns the transportation charge to the client. This process may repeat sequentially for all the orders in the order list, and the result of transportation charges are returned to the client.

The master data may be looked up for the orders one after the other in a sequential manner. This may cause delay in processing and returning the result. Unnecessary data could be brought to internal memory tables in the application layer with too many database round trips. The transport management application loops over these internal memory tables in the application layer to lookup the required data. Users may have to wait for long time to get the transportation charges calculated for even a minimum number of orders such as five or ten. Further, order data have a user interface representation on the graphical user interface and a corresponding unique identifier generated by the transport management application at the database. This provides convenient user interface representation for end users and a unique standardized system representation at the database.

While computing transportation charges for the first order, the order data corresponding to the first order is read from the graphical user interface and converted to the unique identifier, and then, transportation charges are computed on the unique identifier. The computed transportation charges are converted to user interface representation and returned to the client. This conversion of user interface representation to unique identifier and vice-versa may occur for all the orders in the order list one after the other in a sequential and thus time consuming manner.

There is a need to efficiently calculate the transportation charges for orders in the order list in a non-sequential and less time consuming manner. There is also a need to minimize the conversion time for the orders in the order list. Real-time in-memory charge calculation provides efficient calculation of transportation charges for bulk of orders and also minimizes the conversion time for the bulk of orders. According to one embodiment, in-memory database typically relies on volatile memory for computation and storage. The in-memory database may be a relational database, an object oriented database or a hybrid of both. In-memory technology utilizes the maximum capabilities of the underlying hardware, to increase application performance. Information required for processing is usually available in the volatile memory, so computation and read operations can typically be executed without involving hard disk input and output operations, for instance.

Traditionally, a database table is a two dimensional data structure with cells organized in rows and columns. However, according to one embodiment within an in-memory database, memory organization is linear. In a linear memory organization, data may be stored as a row store or a column store. In the row store, the fields of every row in the table are stored in a single row in a sequential manner, whereas in the column store, the fields of a column are stored in a single column, in contiguous memory locations. Row based storage and column based storage, store data that can be accessed by various components of the applications using in-memory database, such as charge computation engine in the transport management application.

The example embodiments illustrated below using FIG. 1 to FIG. 7, describe in detail the real-time in-memory charge computation. FIG. 1 is a block diagram illustrating an exemplary environment for real-time in-memory charge computation, according to an embodiment. The exemplary environment 100 is shown containing client 110, application layer 130, network 150 and in-memory database 160. Merely for illustration, only a representative number and type of entities is shown in FIG. 1. The systems or devices of FIG. 1 are described below in further detail. Network 150 provides connectivity between the application layer 130 and in-memory database 160. Network 150 may be implemented using protocols such as Transmission Control Protocol (TCP) and/or Internet Protocol (IP).

Transport management application 120 is executing in the application layer 130. User interface 115 corresponding to the transport management application 120 is displayed in the client 110. Users may place orders by specifying order data in the user interface 115 of the transport management application 120, and initiate charges calculation (not shown) in the user interface 115. Based on the initiation, the charge calculation function 140 is invoked in the application layer 130. Charge calculation function 140 reads the order data specified in the user interface 115, and invokes charge computation engine 170 of the transport management application 120 in the in-memory database 160. Charge computation engine 170 looks up master data 180 and computes transportation charges for the orders in parallel. Based on the order data specified, master data 180 such as 'agreement', 'calculation sheet', 'rate table', etc., are looked up in the in-memory database 160.

A freight or forwarding order may be linked to a freight or forwarding agreement which in turn may be linked to a calculation sheet. Initially, when an order is placed, 'agreement' master data is looked up to determine the applicable agreement for the placed order. An agreement is a legally binding contract between business partners that details their commitment towards the business. Agreement forms the basis for calculating transportation charges, where one or more business partners are involved. Agreement includes contractual data such as organizational unit information, involved parties, terms of payment, validity dates, etc. Agreement may be linked to a calculation sheet which is a hierarchical table used to calculate transportation charges. Charge computation engine uses calculation sheets to specify which transportation charges to calculate and how to calculate them. Calculation sheets may contain charge items, and the charge items can result in calculated amounts. A charge item can be linked to a rate table where actual rates of charge items are defined. After the charge computation engine determines the charges for the charge items using the corresponding rate tables, sum of the charge items gives consolidated transportation charge. The computed consolidated transportation charges for the orders are returned to the client.

Figure 2:
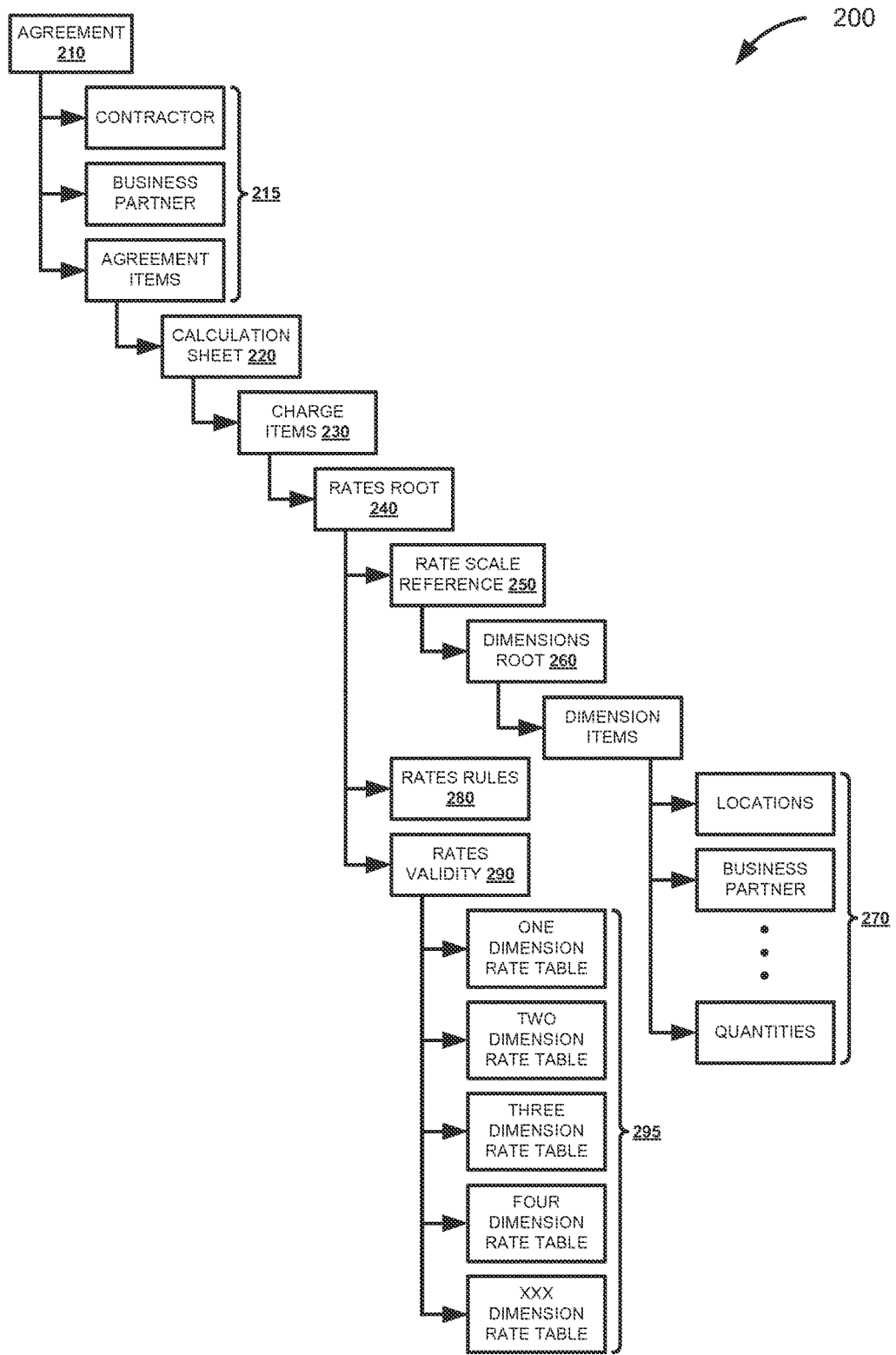
FIG. 2 illustrates an exemplary sample data model of master data, according to one embodiment.

FIG. 2 illustrates an exemplary sample data model of master data, according to one embodiment. The exemplary data model 200 is a minimalistic view of the master data comprising 'Agreement' 210 as a root of a hierarchy comprising contact, business partner, agreement items, etc., as shown in 215. Agreement is linked to a calculation sheet 220 containing itemized charge items 230 for billing purposes. Charge items 230 are linked to a root of rate tables 'rates root' 240 for rate determination during charge calculation. 'Rates root' 240 includes 'rate scale reference' 250, 'rate rules' 280, 'rates validity' 290, etc.

A rate table is a grouping of prices for transportation services. Rate tables have validity period and dimensions. A rate table object defines the dimensions such as distance, location and weight, used for rate calculation. Rates are determined against different combination of dimension values. Dimensions root 260 provide a list of dimensions available in this data model such as locations, business partners, quantities, etc., as shown in 270. Rates root 240 is linked to rates rules 280, where rates rules are used to group on selected dimension such as destination location, weight, volume, etc. Rates validity 290 indicates the validity of rate tables. Rate tables with a corresponding number of dimensions are shown in 295. Rate table stores dimensions as key value pair, such as source location 'India'. Rate table stores the key dimension as unique identifiers. For example, rate table stores source location of 'India' as a unique identifier '1234xxuu' in the in-memory database. Accordingly, while processing an order data with source location as 'India' an implicit conversion takes place in the in-memory database and the rate associated with the source location 'India' is retrieved.

Figure 3:
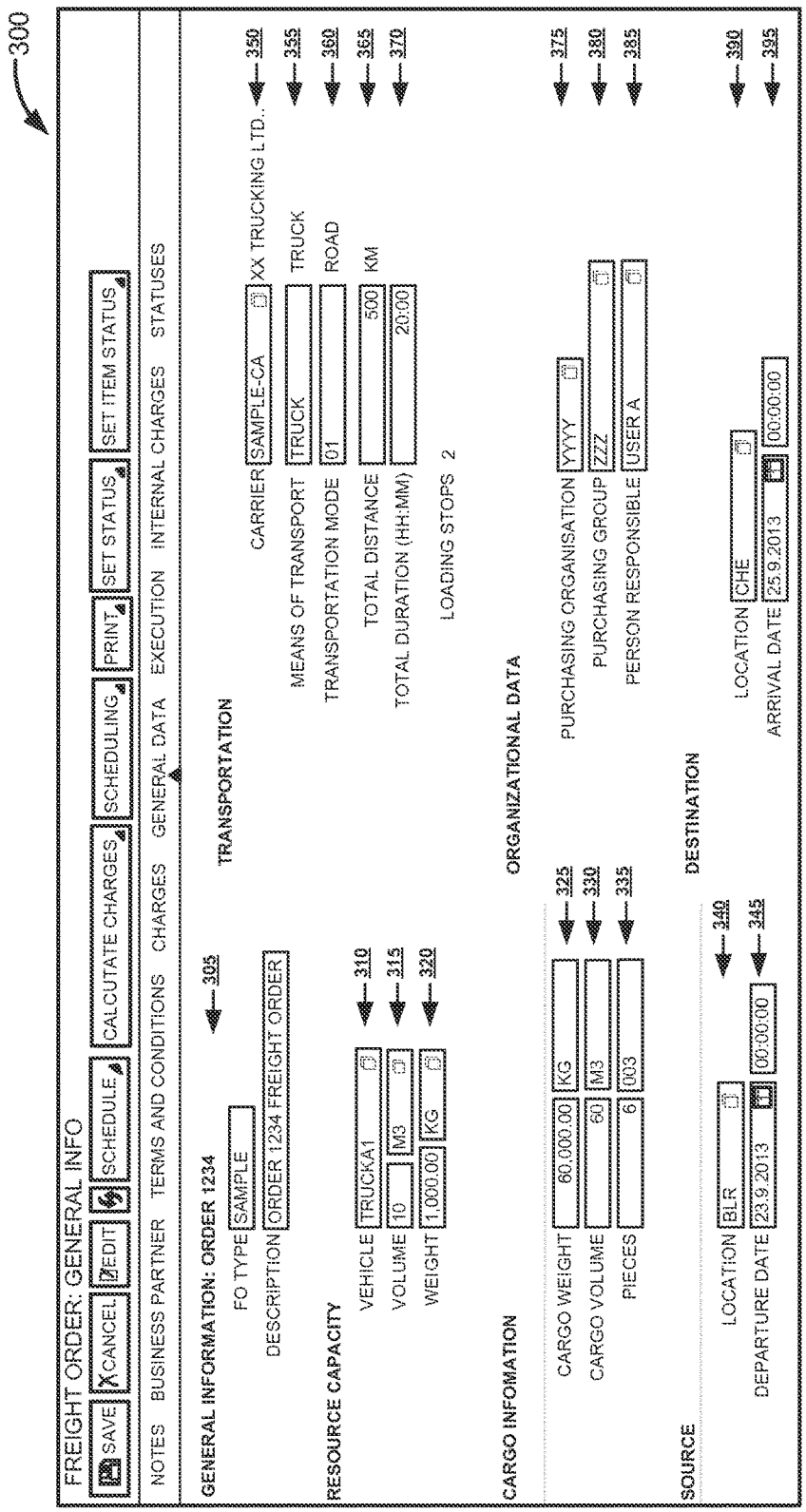
FIG. 3 is a block diagram illustrating a user interface for defining a freight order, according to one embodiment.

In a transport management application displayed in a client user interface, user can define a freight order by specifying order data. FIG. 3 is a block diagram illustrating user interface 300 for defining a freight order, according to one embodiment. While specifying a freight order, order data such as resource capacity, cargo information, source, transportation, organizational data, destination, etc., are specified as shown in user interface 300. General information of freight order identified by name 'order 1234' 305 is specified, in type and description of the general information section. In resource capacity, details such as vehicle type 'TruckA1' 310, volume '10 $m^3$' 315 and weight '1000 kg' 320 are specified. In cargo information, details such as cargo weight '60,000.00 kg' 325, cargo volume '60 $m^3$' 330 and pieces '6' 335 are specified. In source, details such as location 'BLR' 340 and departure date '23.9.2013' 345 are specified.

In transportation, details such as carrier 'sample_ca' XX Trucking Ltd 350, means of transport 'Truck' 355, transportation mode '01' 360 which is road, total distance '500 km' 365, total duration '20:00' 370 and loading stops '2' are specified. In organizational data, details such as purchasing organization 'YYYY' 375, purchasing group 'ZZZ' 380 and person responsible 'user A' 385 are specified. In destination, details such as location 'CHE' 390 and arrival date '25.9.2013' 395 are specified. After the required order data are specified, the freight order named 'order 1234' may be saved. This freight order named 'order 1234' 305 can be edited at a later point of time to modify the order data.

FIG. 4 is a block diagram illustrating user interface 400 for managing cargo information of the freight order, according to one embodiment. The cargo information, specified while defining the freight order is displayed as shown in 400. In item hierarchy, the cargo information associated with individual freight order items is displayed. The cargo information, details such as cargo weight '60,000.00 kg', cargo volume '60 $m^3$' and pieces '6' specified while defining freight order named 'order 1234' is displayed in 410. These details can be edited as required. Status of the freight order named 'order 1234' can be specified such as 'set to loaded', 'set to unloaded', etc.

Transportation charge can be calculated for the freight order as created. FIG. 5 is a block diagram illustrating user interface 500 for calculating transportation charges, according to one embodiment. When 'calculate charges' 505 is initiated, master data is looked up based on the order data specified in the freight order named 'order 1234'. Master data such as business partner 'BP' 510, agreement 'agreement1' 515, calculation sheet 'calsheet1' 520 are identified, as freight order named 'order 1234' is linked to 'agreement1' which in turn is linked to 'calsheet1'. The calculation sheet 'calsheet1' contains itemized charge items, where charge items are linked to rate table. Charge items include items such as rate table, charge type, rate amount, currency, quantity, calculation amount, currency, final amount, currency, unit of measurement, etc. For example, charge item 'loading charge1' 525 is linked to a rate table 'load rate table' as shown in 530. This rate table 'load rate table' is illustrated in FIG. 6

FIG. 6 is a block diagram illustrating user interface 600 of 'load rate table' 605, according to one embodiment. Rate table is associated with a validity period and currency type. Rate table named 'load rate table' 605 is associated with a period with validity from '01.01.2011' and validity to '01.01.2080' 610. For example, loading charges are defined with respect to weight such as, if the weight is lesser than or equal to 100 kilogram (<=100.00 kg) 620 then the rate applicable is 100 INR, if the weight is greater than or equal to 100 kilogram (>=100.00 kg) 625 then the rate applicable is 250 INR, if the weight is greater than or equal to 1000 kilogram (>=1000.00 kg) 630 then the rate applicable is 300 INR, if the weight is greater than or equal to 10,000 kilogram (>=10,000 kg) 640 then the rate applicable is 400 INR, etc. Based on the validity period and the chargeable quantity, weight in the rate table named 'load rate table' is logically computed. This logically computed rate is used for calculation in the calculation sheet. For the charge item 'loading charge1' 525 of FIG. 5, chargeable unit is 60 kilogram, accordingly rate of 100 INR is looked up from rate table named 'load rate table' 605 since for weight is lesser than or equal to 100 kilogram (<=100.00 kg) 620 the rate defined is 100 INR.

Based on the rate looked up from the rate table named 'load rate table' 605 of FIG. 6, transportation charge is calculated and displayed in the charge items table against the specific charge item, e.g., 'loading charge1' 525, in 'final amount' 530 of FIG. 5. The individual final amounts are totaled, and the sum of the transportation charges for the charge items are calculated and displayed in 'sum' 540. This sum is displayed in the settlement data 550 section as charges to be invoiced. Details such as invoice status, charge calculation status, total amount in local currency, etc., are displayed. Dates such as calculation date, exchange rate date, etc., are also displayed.

In one embodiment, rate rules define constraints that must be applied while logically computing the rates. For example, in a 'quantity rate table' (not illustrated), rates for quantity may be defined such as, if the quantity is equal to 100 pieces then the rate applicable is 1000 INR, if the quantity is equal to 200 pieces then the rate applicable is 2,000 INR, if the quantity is equal to 300 pieces then the rate applicable is 3,000 INR, etc. In case a charge item in the calculation sheet has quantity of 150, a direct mapping to the rate table 'quantity rate table' may not be available. Rate rule can be specified where if the quantity is greater than 100 pieces and lesser than 200 pieces, the rate corresponding to the higher quantity is required to be used. Accordingly, rate 2,000 INR is computed and/or looked up from the rate table 'quantity rate table' for the quantity of 150 pieces. This rate rule is merely exemplary, more often rate rules are combination of multiple rate rules.

Figure 7:
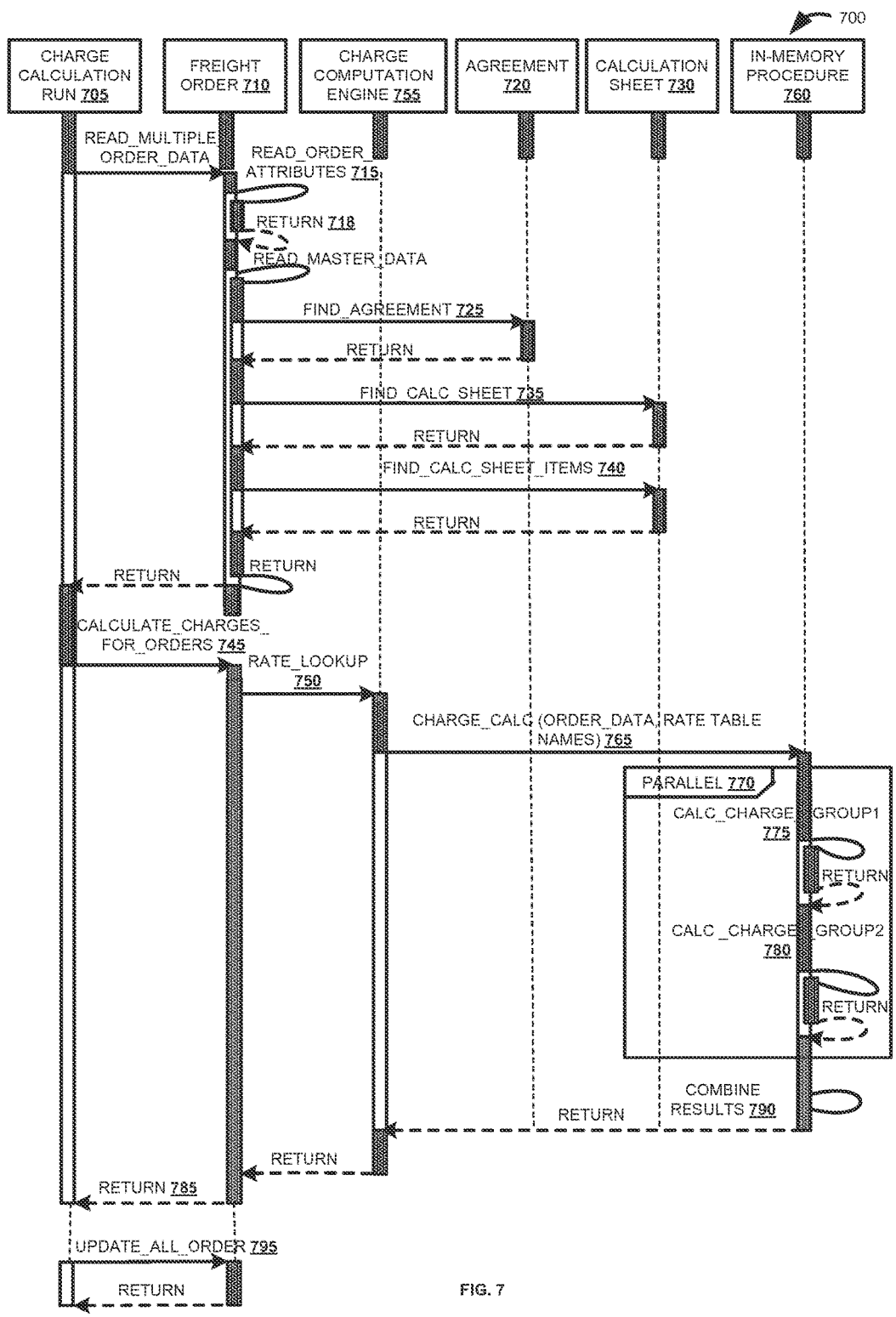
FIG. 7 illustrates a sequence diagram for real-time in-memory charge computation, according to one embodiment

FIG. 7 illustrates a sequence diagram 700 for real-time in-memory charge computation, according to one embodiment. For example, consider an 'order list1' comprising 20 orders. When user initiates computation of charges, e.g., by selecting 'calculate charges' 505 in FIG. 5, for 'order list1', 'charge calculation run' 705 function in the application layer invokes 'freight order' 710 function to read order data 'read_order_attributes' 715 in the individual orders in 'order list1', e.g., from the corresponding user interface. The master data required for the orders in 'order list1' such as 'agreement' 720 is looked up by invoking 'find_agreement' 725 function in 'freight order' 710 function. The other master data required for the orders in 'order list1' such as 'calculation sheet' 730 are also looked up by invoking 'find_calc_sheet' 735 function in 'freight order' 710 function.

The calculation sheet items are looked up by invoking 'find_calc_sheet_items' 740 function in the 'freight order' 710 function. In one embodiment, performing look up in the one or more master data comprises using a single join operation in the in-memory database tables. Once the required order data and master data are read or looked up, charge is logically computed for all the orders in the 'order list1'. 'Charge calculation run' 705 function invokes 'calculate_charges_for_orders' 745 function to compute charges for the orders in the 'order list1'. 'Freight order' 710 function invokes 'rate_lookup' 750 at the 'charge computation engine' 755 to look up rate tables for the orders in the 'order list1'. Rate tables have dimensions used for rate calculation. Based on the order data required dimension values are determined in the rate table. Rates are determined against different combination of dimension values. 'Charge computation engine' 755 in the in-memory database (as shown in FIG. 1) is responsible for calculating the transportation charges for the orders in the 'order list1'.

'Charge computation engine' 755 invokes in-memory procedure 760 in the in-memory database for calculating transportation charges based on the order data returned at 718 and the rate tables looked up at 750. The method 'charge_calc (order_data, rate_table_names)' 765 is invoked in the in-memory procedure for calculating transportation charges. When the rate tables are looked up at 750, the required numbers of dimensions in the rate tables are determined for the individual orders in the 'order list1'. The orders in the 'order list1' are split and grouped based on the number of dimensions in the rate tables. For example, split the orders requiring one dimension in rate tables and group it into 'group1', and split the orders requiring two dimensions in rate tables and group it into 'group2', etc. Accordingly all the orders in the 'order list1' are split and grouped. The groups are processed in parallel and the transportation charges are computed.

For example, orders grouped into 'group1', 'group2', 'group3', etc., are processed in parallel simultaneously and transportation charges are calculated. While processing such orders in parallel, rate tables are looked up to determine rates and the transportation charges are calculated. Because of grouping the orders based on the number of dimensions, the rate tables are looked up only once for one group. For example, 'group 1' and 'group 2' is processed in parallel 770, while processing 'group1', 'rate table1' is looked up and logical computations are performed on the 'rate table1' only once, and a transportation charge for 'group1' is computed real-time in 'calc_charge_group1' 775. Similarly, while processing 'group2', 'rate table2' is looked up and logical computations are performed on the 'rate table2' only once, and a transportation charge for 'group2' is computed real-time in 'calc_charge_group2' 780. In one embodiment, individual orders grouped into a specific group may require different rate tables to be looked up to determine rates, and correspondingly transportation charges are computed for the individual orders in the specific group.

The transportation charges for 'group1' and 'group2' computed real-time are combined and a sum of these transportation charges is returned in 'return' 785 to the 'charge calculation run' 705 function from 'combine_results' 790. Based on the returned computed charges in 'return' 785, orders in the 'order list1' are updated using 'update_all_order' 795. In-memory database uses column store and every field in the in-memory database is an index in itself. Accordingly an implicit conversion from the user interface representation to the system generated unique identifier takes place rather than explicit conversion. Conversion time is drastically reduced using the technique described above in in-memory database in comparison to an explicit conversion. After the implicit conversion and calculation of transportation charges, only the results are returned to the application server.

Figure 8:
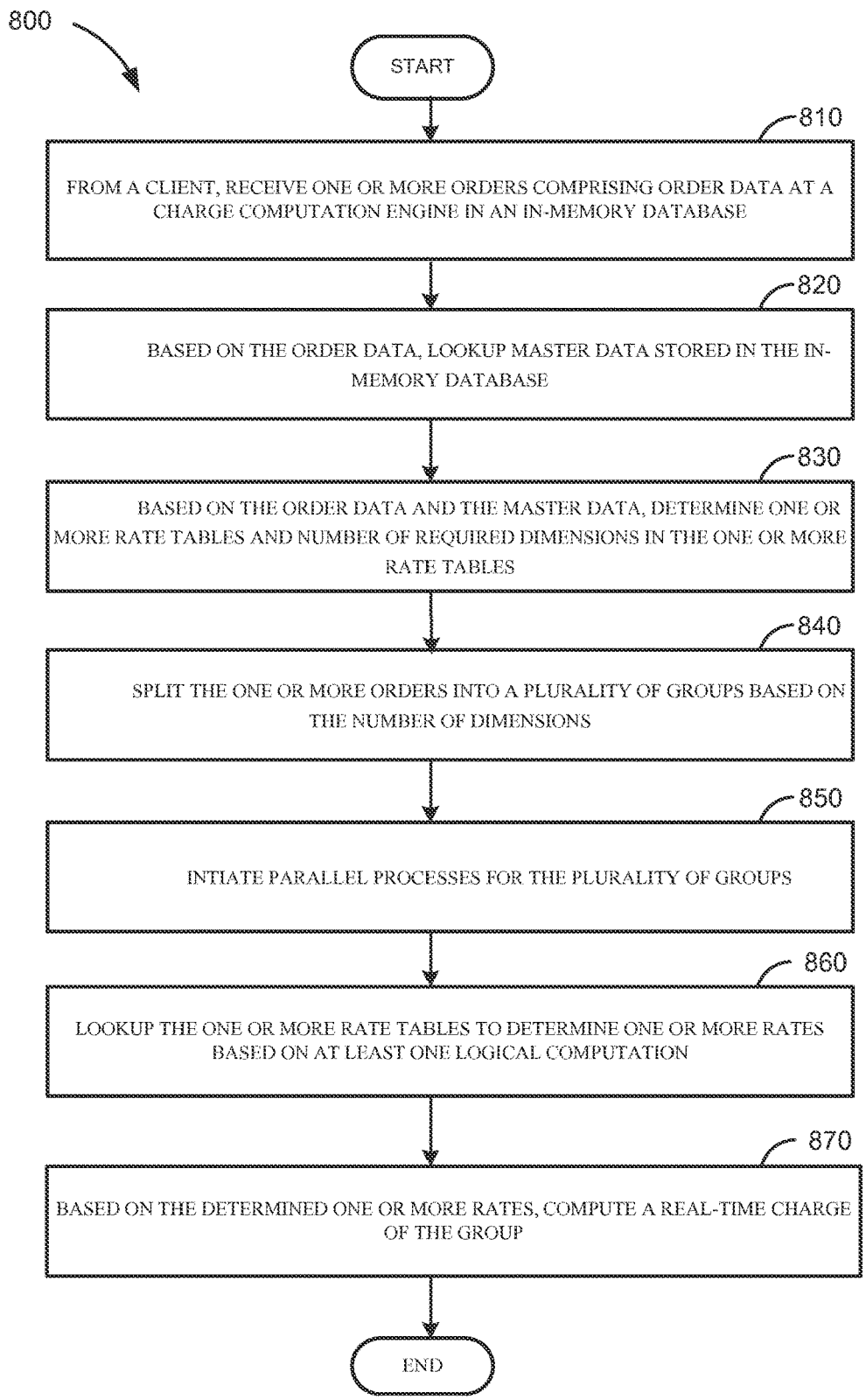
FIG. 8 is a flow diagram of a process of real-time in-memory charge computation, according to one embodiment.

FIG. 8 illustrates a flow diagram of process 800 of real-time in-memory charge computation, according to one embodiment. At 810, one or more orders comprising order data are received from a client, at a charge computation engine in an in-memory database. At 820, based on the order data, lookup master data stored in the in-memory database. The lookup is based on one or more logical computations on the one or more master data. At 830, one or more rate tables and number of required dimensions in the one or more rate tables are determined based on the order data and the one or more master data. The one or more rate tables comprise plurality of dimensions data. At 840, the one or more orders are split into a plurality of groups based on the number of dimensions. At 850, parallel processes are initiated for the plurality of groups. A parallel process for a group performs 860 and 870. At 860, the one or more rate tables are looked up to determine one or more rates by logical computations on the number of dimensions. And at 870, one or more rates are determined to compute in real-time a charge of the group.

The in-memory charge computation for a freight forwarder explained above is merely exemplary. The in-memory charge computation can be implemented in a similar manner in case of goods manufacturers and carriers also. The various embodiments described above have a number of advantages. Orders are split and processed in parallel so users get the transportation charges calculated in minimum time duration. Due to this parallel processing the enormous volume of master data such as rate table is looked up only once. This reduces the amount of data brought to the internal memory tables in the application layer and reduces the number of database round trips. Minimum latency is achieved because of the parallel processing of orders. Accordingly, a significant performance boost is achieved. Further, the implicit conversion of order data from the user interface representation to the system generated unique identifier at the in-memory database reduces the conversion time as well. This implicit conversion of user interface representation to system generated unique identifier and vice-versa occurs for all the orders while parallel processing.

Some embodiments may include the above-described methods being written as one or more software components. These components, and the associated functionality may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
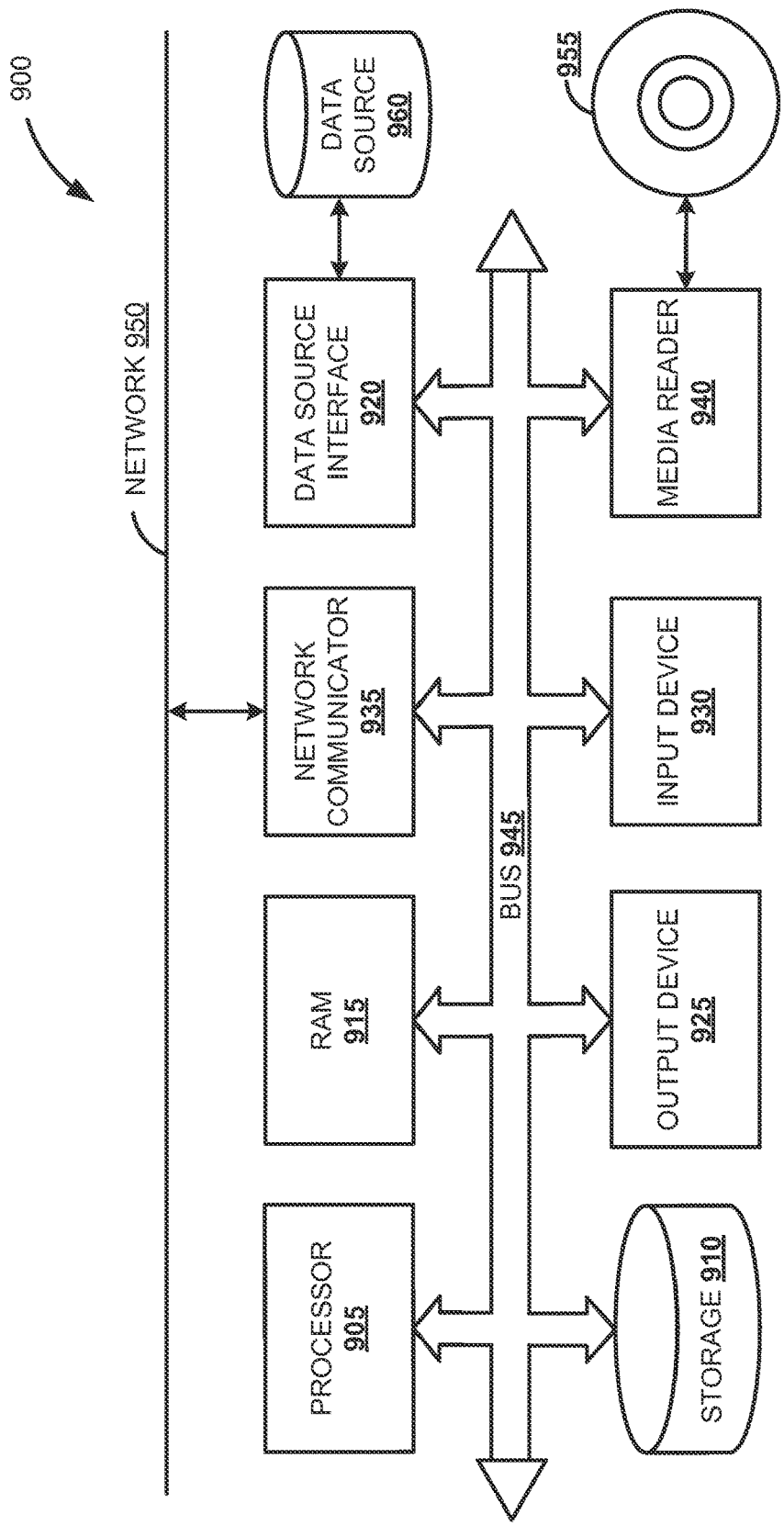
FIG. 9 is a block diagram of an exemplary computer system, according to one embodiment.

FIG. 9 is a block diagram of an exemplary computer system 900. The computer system 900 includes a processor 905 that executes software instructions or code stored on a computer readable storage medium 955 to perform the above-illustrated methods. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, all of the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:

execute a transport management application, the transport management application comprising a charge calculation function executed at an application layer, and a charge computation engine executed in an in-memory database;

from a client which displays a graphical user interface of the transport management application, receive at the application layer one or more orders comprising order data, where the one or more orders relate to physical transportation of goods;

invoke, in the application layer, execution of the charge calculation function, wherein the charge calculation function reads the order data and invokes the charge computation engine in the in-memory database, the in-memory database being connected to the application layer over a network;

based on the order data and one or more master data, determine, by the charge computation engine in the in-memory database, one or more rate tables and number of required dimensions in the one or more rate tables, wherein the one or more rate tables comprises a plurality of dimensions data;

perform, by the charge computation engine, a single look up of the determined one or more rate tables for processing the one or more orders;

split, by the charge computation engine, the one or more orders into a plurality of groups based on the number of dimensions in the determined one or more rate tables required for processing the one or more orders;

initiate computation by the charge computation engine in the in-memory database to process in parallel the plurality of groups, wherein a parallel process for a group is performed for each group and comprises:
   determine from the determined one or more rate tables one or more rates; and
   based on the determined one or more rates, compute a real-time charge of the group;
   at the application layer, receive from the in-memory database the real-time charge of the group; and
   render the real-time charge of the group in the graphical user interface in the client.

2. The article of manufacture of claim 1, wherein the instruction to split the one or more orders into the plurality of groups based on the number of dimensions, furthers comprises instructions which when executed by a computer, cause the computer to:
   split, by the charge computation engine, the one or more orders into a first group based on a first number of dimension and a second group based on a second number of dimension;
   initiate computation by the charge computation engine in the in-memory database to process in parallel the first group and the second group, wherein a first parallel process for the first group, comprises:
      determine from the determined one or more rate tables one or more rates; and
      based on the determined one or more rates, compute a real-time charge for the first group;
   wherein a second parallel process for the second group, comprises:
      determine from the determined one or more rate tables one or more rates; and
      based on the determined one or more rates, compute a real-time charge for the second group.

3. The article of manufacture of claim 2, further comprising instructions which when executed by the computer further causes the computer to:
   consolidate the computed real-time charge for the first group and the computed real-time charge for the second group;
   receive the real-time charge of the first group and the second group from the in-memory database at the application layer; and
   return the consolidated computed real-time charge of the first group and the second group in the graphical user interface to the client.

4. The article of manufacture of claim 1, wherein determining from the one or more rate tables the one or more rates is based on one or more logical computations on the one or more of the plurality of dimensions data.

5. The article of manufacture of claim 1, further comprising instructions which when executed by the computer further causes the computer to:
   return the computed real-time charge of the group to the client.

6. The article of manufacture of claim 1, wherein performing lookup in the one or more master data comprises using a single join operation in the in-memory database.

7. The article of manufacture of claim 1, wherein while determining the one or more rate tables, perform an implicit conversion of the order data to a system generated unique identifier.

8. A computer implemented method of real-time in-memory charge calculation, the method comprising:
   executing a transport management application, the transport management application comprising a charge calculation function executed at an application layer, and a charge computation engine executed in an in-memory database;
   from a client which displays a graphical user interface of the transport management application, receiving at the application layer one or more orders comprising order data, where the one or more orders relate to physical transportation of goods;
   invoking in the application layer execution of the charge calculation function, wherein the charge calculation function reads the order data and invokes the charge computation engine in the in-memory database, the in-memory database being connected to the application layer over a network;
   based on the order data, performing, by the charge computation engine, a single lookup in one or more master data stored in the in-memory database, wherein the lookup is based on one or more logical computations on the one or more master data;
   based on the order data and the one or more master data, determining by the charge computation engine in the in-memory database, one or more rate tables and number of required dimensions in the one or more rate tables, wherein the one or more rate tables comprises a plurality of dimensions data;
   performing, by the charge computation engine, a single look up of the determined one or more rate tables for processing the one or more orders;
   splitting, by the charge computation engine, the one or more orders into a plurality of groups based on the number of dimensions in the determined one or more rate tables required for processing the one or more orders; and
   initiating computation by the charge computation engine in the in-memory database to process in parallel the plurality of groups, wherein a parallel process for a group is performed for each group and comprises:
      determine from the determined one or more rate tables one or more rates; and
      based on the determined one or more rates, computing a real-time charge of the group;
      at the application layer, receive from the in-memory database the real-time charge of the group; and
      rendering the real-time charge of the group in the graphical user interface in the client.

9. The method of claim 8, splitting the one or more orders into the plurality of groups based on the number of dimensions, furthers comprises instructions which when executed by a computer, cause the computer to:
splitting, by the charge computation engine, the one or more orders into a first group based on a first number of dimension and a second group based on a second number of dimension;
initiating computation by the charge computation engine in the in-memory database to processes in parallel the first group and the second group, wherein a first parallel process for the first group, comprises:
determine from the determined one or more rate tables one or more rates; and
based on the determined one or more rates, computing a real-time charge for the first group;
wherein a second parallel process for the second group, comprises:
determine from the determined one or more rate tables one or more rates; and
based on the determined one or more rates, computing a real-time charge for the second group.

10. The method of claim 9, further comprising:
consolidating the computed real-time charge for the first group and the computed real-time charge for the second group;
receive the real-time charge of the first group and the second group from the in-memory database at the application layer; and
returning the consolidated computed real-time charge of the first group and the second group in the graphical user interface to the client.

11. The method of claim 8, wherein determining from the one or more rate tables the one or more rates is based on one or more logical computations on the one or more of the plurality of dimensions data.

12. The method of claim 8, further comprising instructions which when executed by the computer further causes the computer to:
returning the computed real-time charge of the group to the client.

13. The method of claim 8, wherein performing lookup in the one or more master data comprises using a single join operation in the in-memory database.

14. The method of claim 8, wherein while determining the one or more rate tables, perform an implicit conversion of the order data to a system generated unique identifier.

15. A computer system for real-time in-memory charge computation, comprising:
a computer memory to store program code; and
a processor to execute the program code to:
execute a transport management application, the transport management application comprising a charge calculation function executed at an application layer, and a charge computation engine executed in an in-memory database;
from a client which displays a graphical user interface of the transport management application, receive at the application layer one or more orders comprising order data, where the one or more orders relate to physical transportation of goods;
invoke in the application layer execution of charge calculation function, wherein the charge calculation function reads the order data and invokes the charge computation engine in the in-memory database, the in-memory database being connected to the application layer over a network;
based on the order data, perform a single lookup in one or more master data stored in the in-memory database, wherein the lookup is based on one or more logical computations on the one or more master data;
based on the order data and the one or more master data, determine, by the charge computation engine in the in-memory database, one or more rate tables and number of required dimensions in the one or more rate tables, wherein the one or more rate tables comprises a plurality of dimensions data;
perform, by the charge computation engine, a single look up of the determined one or more rate tables for processing the one or more orders;
split, by the charge computation engine, the one or more orders into a plurality of groups based on the number of dimensions in the determined one or more rate tables required for processing the one or more orders; and
initiate computation by the charge computation engine in the in-memory database to process in parallel the plurality of groups, wherein a parallel process for a group is performed for each group and comprises:
determine from the determined one or more rate tables one or more rates; and
based on the determined one or more rates, compute a real-time charge of the group;
at the application layer, receive from the in-memory database the real-time charge of the group; and
render the real-time charge of the group in the graphical user interface in the client.

16. The system of claim 15, splitting the one or more orders into the plurality of groups based on the number of dimensions comprises:
split, by the charge computation engine, the one or more orders into a first group based on a first number of dimension and a second group based on a second number of dimension;
initiate computation by the charge computation engine in the in-memory database to process in parallel the first group and the second group, wherein a first parallel process for the first group, comprises:
determine from the determined one or more rate tables one or more rates; and
based on the determined one or more rates, compute a real-time charge for the first group;
wherein a second parallel process for the second group, comprises:
determine from the determined one or more rate tables one or more rates; and
based on the determined one or more rates, compute a real-time charge for the second group.

17. The system of claim 16, further comprises:
consolidate the computed real-time charge for the first group and the computed real-time charge for the second group;
receive the real-time charge of the first group and the second group from the in-memory database at the application layer; and
return the consolidated computed real-time charge of the first group and the second group in the graphical user interface to the client.

18. The system of claim 15, wherein determining from the one or more rate tables the one or more rates is based on one or more logical computations on the one or more of the plurality of dimensions data.

19. The system of claim 15, further comprising instructions which when executed by the computer cause the computer to:

perform lookup in the one or more master data using a single join operation in the in-memory database, wherein the lookup of the one or more rate tables occurs once.

20. The system of claim 15, wherein while determining the one or more rate tables, perform an implicit conversion of the order data to a system generated unique identifier.

\* \* \* \* \*